United States Patent [19]
Older

[11] 3,949,420
[45] Apr. 6, 1976

[54] TAPE PROGRAM LOCATION METHOD AND MEANS

[76] Inventor: R. Robert Older, 2413 S. Broadway St., Santa Ana, Calif. 92707

[22] Filed: May 28, 1974

[21] Appl. No.: 473,808

[52] U.S. Cl. ................................................ 360/72
[51] Int. Cl.² ........................................ G11B 15/18
[58] Field of Search ............... 360/72, 73; 242/191; 179/100.1 R, 100.1 PS, 100.1 DR; 226/24

[56] References Cited
UNITED STATES PATENTS

| | | |
|---|---|---|
| 3,714,382 | 1/1973 | Sykes.................................. 360/72 |
| 3,812,532 | 5/1974 | Crosser et al......................... 360/72 |

*Primary Examiner*—Robert S. Tupper
*Attorney, Agent, or Firm*—Grover A. Frater

[57] ABSTRACT

A comparison system and method based upon comparing tape transport mechanism movement with a position reference used a light sensor to sense mechanism movement, making it possible to add automatic tape segment search capability to standard audio and video tape player units without modification of those units.

8 Claims, 5 Drawing Figures

U.S. Patent  April 6, 1976  3,949,420
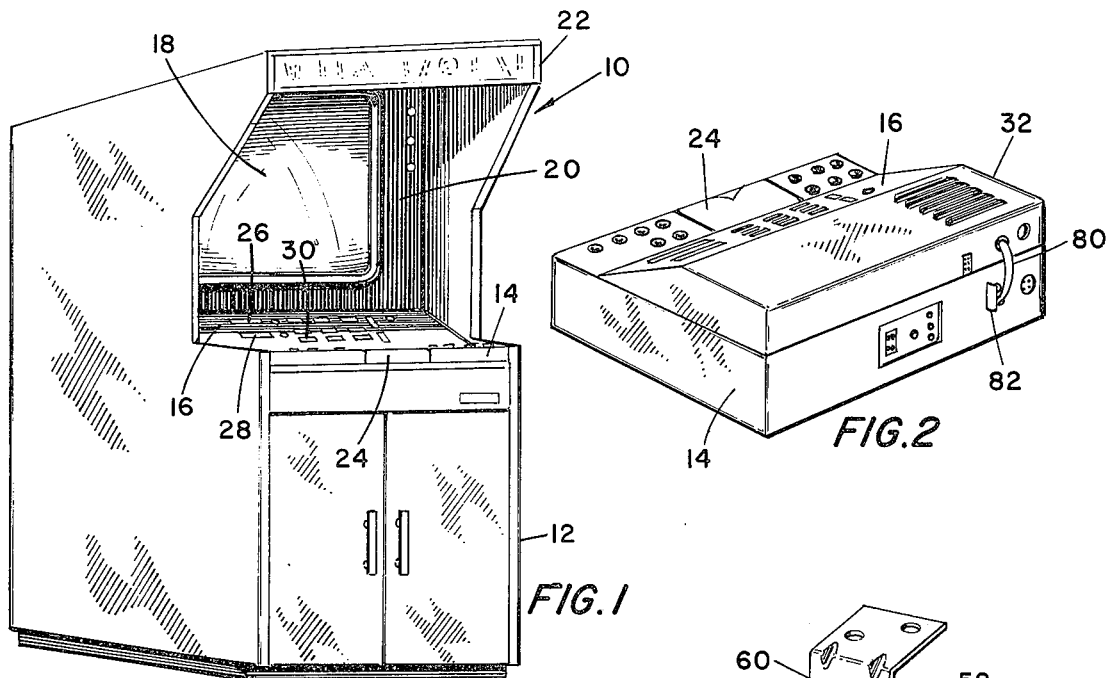
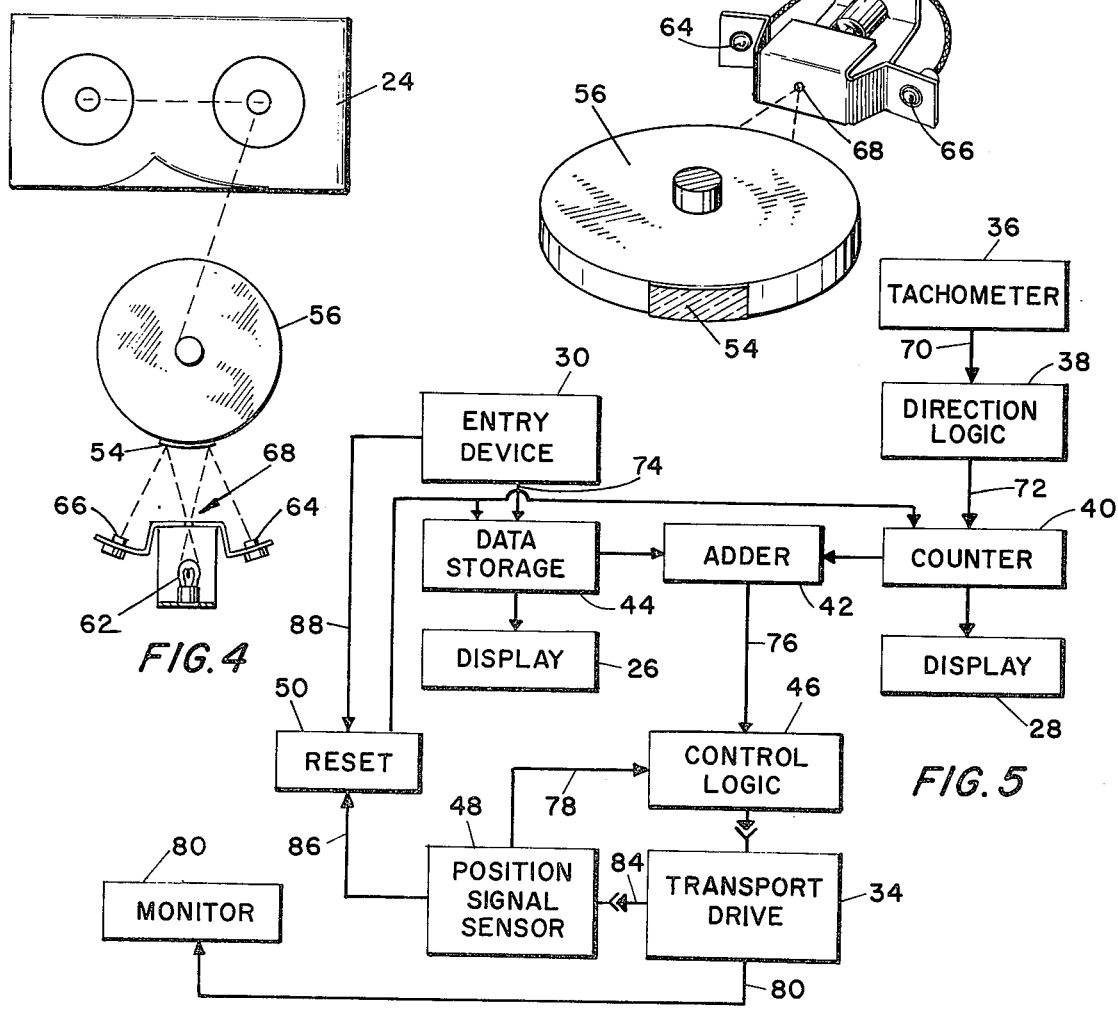

TAPE PROGRAM LOCATION METHOD AND MEANS

BACKGROUND OF THE INVENTION

This invention relates to improvements in methods and systems for searching to find particular segments along the length of a tape and to improvements in apparatus for accomplishing that purpose.

Whenever the information that is recorded on an audio tape or a video tape is such that part of that information is useful independently of the information on other parts of the tape, it is desirable to be able to locate the desired information without beginning at one end of the tape and proceeding to examine all of the data. The process of attempting to locate that portion of the tape on which the desired information is stored is called "searching". This invention relates to improvements in systems and apparatus for doing that kind of searching.

Tape offers a convenient and inexpensive way to store large amounts of information in a relatively small space. But that advantage is lost in large degree unless reasonable access may be had to the information stored on the tape. Providing access to taped information can be divided into two tasks. One is the task of transporting the tape. That task involves driving the tape in forward or reverse direction past the recording and reading apparatus called "heads". The other task involves recognition of the desired information. The recognition problem may be solved either by recognizing stored data or by knowing at what distance along the tape the desired data occurs and then measuring distance. Both of these approaches have been employed in the past. The "recognition of data" approach is used extensively in data retrieval apparatus of the kind that is peripheral to computers, and in which tape is transported from reel to reel. Information identification data is recorded on the tape at a point adjacent to the information to be stored. That location information is recorded in a fashion that permits reading location during very high speed movement of the tape. Systems of that kind are specially designed and tend to be very elaborate both im the mechanisms they employ and the systems by which they are controlled. An object of the invention is to provide a less costly and much more universally applicable apparatus and system.

The other approach, i.e., measurement of distance along the tape, has been provided only in rudimentary form. It is common for tape recorders and players to include a mechanical turn counter with a reset arrangement so that the counter can be set to zero at any time. Those counting systems have been very rudimentary in that they include no way to correlate the setting of the counter with the position on the tape except by the most elementary manual means. While adequate for some purposes, these mechanical counting arrangements are not satisfactory where cut-and-try searching is not permitted or is not adequate.

The invention provides an intermediate solution. It provides automatic searching by measurement of distance along the tape whereby to avoid the complexity that has attended the attempts to search by recognition of data, while providing freedom from fumbling and an ease of operation far beyond what has been possible in the mechanical counting systems.

It is an object of the invention to make possible a system and search apparatus which will provide the accuracy that heretofore has been available only in the sophisticated, specialized data recognition systems, and to do that less expensively and in a manner that makes it possible to add search capability to existing general purpose tape players and recorders.

Doing that, adding search capability to existing general purpose tape players and video display systems, is one of the principle objects of the invention. A number of manufacturers provide very fine tape transporting and tape reading apparatus in both the reel-to-reel and the cassette styles. Standardization of the reels and of the cassettes and of the speeds at which they operate has resulted in a substantial degree of similarity and commonality in the structures that are produced by different manufacturers. The invention makes it possible to add search capability to these pre-existing and readily available machines without any need to redesign or to modify them. Thus, the invention makes it possible to provide new products and new systems which utilize, without change, all of the development effort that was devoted to creating and producing the building blocks of this new system.

The embodiment selected for illustration in the accompanying drawings was selected in part because it illustrates how the invention makes it possible to provide a very sophisticated, specialized audio-visual display system at minimum cost. The unit shown in FIG. 1 of the drawing is used in making sales presentations to prospective purchasers of automobiles. Sales information in the form of animated demonstrations of automobile styling, performance, quality, and the like, are recorded along with spoken sales explanations on an audio-video tape package in cassette form. That cassette has been placed in a video tape player which forms part of the console of FIG. 1. The tape is "played" by reading it and displaying the video information on the television screen and by projecting the sound record from speakers that are housed in the console. The sales person can secure access to any portion of the tape by using the keyboard that is visible just above the tape player. A prospective purchaser's questions can be answered by playing a pre-recorded sequence from the tape. The sales person has access to that sequence simply by punching a few buttons. The prospect can view a colored vidio picture relating to the points in which he has some interest. This powerful sales tool employs a standard video monitor, a standard speaker system, and a standard video cassette tape player. Even the cabinet is standard. The keyboard unit is provided by the invention. Beyond that, only the tape recording is special.

It will be apparent that the system has a wide variety of applications. It can also be used as a teaching tool, as an information library system for business and medical records, and in a host of other applications.

SUMMARY OF THE INVENTION

The invention is applicable to tape transport mechanisms which have an element that rotates in one direction while the tape is being transported forwardly, which rotates in the opposite direction when the tape is being transported in the reverse, or rewind, direction, and which does not rotate when the tape is not being transported. The degree of rotation must be a measure of the degree in which the tape has been transported. So that the angular position of that element is an accurate indicator of the position of reference points along the tape. The invention includes a means for counting revolutions of that member and for determining the direction of revolution. A means is provided for comparing those revolutions with some reference number of revolutions to find a difference count. A means is provided for utilizing the existing control structure of the tape transport system to make that transport drive the tape in the forward direction when the difference count has one sign, and for making the tape transport drive the tape in the opposite direction when the difference count has the opposite sign. The system stops the tape transport when the difference count has arrived at zero, or some count that is equivalent to zero. Most tape players, all of the audio tape players and all of the audio-video tape players, include a circuit which furnishes an audio output signal when a sound recording passes the read head. In the preferred form of the invention, that audio output circuit is utilized in establishing correspondence between the initial position of the tape and the reference count.

In the preferred form of the invention, a mirror is attached to, and is carried by, a rotating element in the tape transport mechanism. That mirror may be no more than a short length of reflective, plastic tape which is fixed to the side of a drive wheel with an adhesive. A light source and a means for receiving light from that source after reflection from the mirror is added to the tape transport mechanism. While not essential, the preferred embodiment makes no other change in the player. Instead, it includes a unit that is simply added on to the tape player. One of the side panels of the player is removed and replaced with a substitute panel on which the light source and pick-ups are mounted. They may be mounted on that substitute panel along with the system components.

DRAWING

In the drawing:

FIG. 1 is a pictorial view of an enclosure which houses a system embodying the invention;

FIG. 2 is a pictorial view of the upper portions and the rear of a standard audio-video tape cassette player whose upper cover has been replaced with an enclosure housing added system components;

FIG. 3 is a pictorial view of the tachometer that is fixed to the added upper enclosure of FIG. 2 together with a rotating element that forms a part of the standard video tape player of FIG. 2;

FIG. 4 is a schematic diagram illustrating operation of the apparatus of FIG. 3; and FIG. 5 is a block diagram of a system according to the invention.

In FIG. 1, the numeral 10 designates the display unit generally. It consists of a cabinet 12 whose side walls are recessed above the mid-height of the cabinet to afford easy access to a video tape player 14 which is mounted at the forward edge of the cabinet in the manner of a work counter. The cutouts at the cabinet sides also permit easy access to the keyboard 16 which is mounted at the rear of the upper side of the tape player. Above the keyboard is a video monitor whose screen 18 is visible. At the right of the screen is a vertical sound panel 20. The lower part of that panel hides a grille beind which loud speakers are mounted. The upper part carries control knobs for the video monitor. The monitor screen and the panel are mounted back in the cabinet so that they front on the plane that extends through the upper edge of the keyboard 16. That arrangement permits easy access to the keyboard and it permits utilizing the forwardly projecting upper part 22 of the cabinet as a hood to shield the display tube 18 of the monitor from lights that otherwise might cause reflections.

The front edge of the cassette 24 is visible in FIG. 1 along with some of the controls that form a part of the cassette player. The keyboard 16 includes display Different two digital display windows 26 and 28 and it includes a ten-key or button data input button set 30. This model is arranged so that a prospective purchaser standing in front of the screen, alongside the sales person, can view the cassette player and the keyboard as well as the display screen. This particular arrangement is made for the circumstance for which the prospect might be reluctant to take time to listen to a sales presentation. He is in enticed to participate by generating an interest in the diplay apparatus and then transferring his interest to the information being displayed. Difference models of automobiles and scenes depicting these automobiles in different circumstances and environments are recorded on the tape. If, for example, the prospect is interested in an automobile that can haul a boat, the sales person simply pushes the keyboard buttons to enter a count corresponding to the position of a tape segment relating to seller's automobiles in a boating and sporting environment. Other prospects might be shown tape segments depicting performance charts or safety or convenience features. To do that, the salesperson simply operates the keyboard to enter a count corresponding to a segment that depicts the kind of information that he believes to be appropriate to his prospect's interests.

Obviously, that same unit can be used for tasks other than sales presentations. It can be used to teach repair procedures or to demonstrate how to solve mathematical problems, to show a tour guide what a prospective tour will include, to enable examination of public documents, and to perform an endless series of tasks. No special expertise is required of the operator other than the ability to refer to a chart that correlates position numbers with tape segments, and the ability to punch those position numbers into the keyboard.

The invention makes use of existing tape transport mechanisms and logic. The standard video tape player and the standard audio tape player (other than the small home variety) include an input terminal arrangement that permits operation of the transport mechanism and the recording and playback heads from a remote position simply by furnishing electrical signals to that input terminal. A video tape player of that kind is shown in FIG. 2. It is the lower unit 14. The upper unit 32 is added in accordance with the invention. Several manufacturers produce video tape recorders having a same size and shape, and the player 14 is one of those units. The standard unit has an upper enclosing panel. That has been removed and the add-on structure 32 has replaced it in FIG. 2.

The unit 32 includes all of the elements of FIG. 5 except the transport drive 34 which forms part of the tape player 14. Unit 32 includes the tachometer 36, the direction logic unit 38, a counter 40, an adder 42, a data storage unit 44, a control logic unit 46, a position signal sensor 48, a reset unit 50, an entry device which is the button set of keyboard 16, and two display units 26 and 28 which, along with the entry device, are visible on the keyboard 16 in FIG. 1.

The tachometer 36 is shown in FIG. 3. It consists of a sensing structure 52 and a mirror 54. The mirror 54 is formed by a short strip of tape one side of which is covered with adhesive and the other side of which is mirrored. It is made to adhere to the rim of the rotating element 56 which constitutes one of the elements in the transport drive 34. All of the tape players have such a rotating element, and the relationship of that element to the tape is shown schematically in FIG. 4. The tape cassette 24 is shown. A reel-to-reel tape handling structure could have been shown just as well. The supply reel and the take-up reel are interconnected so that they are driven, either one at a time, one for reverse transporting and one for forward transporting. As previously pointed out, the drive mechanism includes some kind of a rotating member. It may be the actual drive wheel that engages the tape holder, or it may be some other wheel in the drive chain. Whatever that wheel is, it is numbered 56 in FIGS. 3 and 4, and it carries the mirror 54 at its edge.

The structure 52 includes a bracket 60 upon which is mounted a light source in the form of lamp 62 along with two light sensors 64 and 66. In this example, the light sensors are solar cells. A sensor of the kind that provides an electrical signal only when it is subjected to light, or only when it is not subjected to light, is preferred. However, a cell of a kind whose resistance changes with light intensity can be employed in the invention. Light from source 62 is projected through a small opening 68 in the bracket 60 so that it falls on the perimeter of the rotating element 56. When that element has rotated to bring the mirror to the side toward the lamp, light from the lamp will be reflected from the mirror and will impinge upon one or both of the sensors 64 and 66.

Let it be assumed that the member 56 is rotating counter-clockwise in FIG. 4. An examination of the dashed lines that indicate light path will make it clear that when the mirror 56 is approaching the light, light will first be reflected from the lamp 62 to the sensor 66 and no light will be reflected from the lamp to sensor 64. However, as the rotatable element continues to turn counterclockwise, the mirror 56 will be moved into the position that it occupies in FIG. 4. The mirror is sufficiently long so that light is reflected to both of the sensors 64 and 66. Subsequently, as the member continues to rotate and the mirror is carried off toward the right in FIG. 4, light will no longer be reflected to sensor 66, although it will continue to be reflected to sensor 64 for a period of time. Thus it is that when the member 56 rotates in a counter-clockwise direction, first sensor 66 and then both sensors 64 and 66, and finally, only sensor 64 will be subjected to light. First, an electrical signal from sensor 66 and then an electrical signal from both sensors, and finally, an electrical signal only from sensor 64 will be applied by line 70 from the tachometer 36 to the directional logic unit 38. The directional logic unit 38 is arranged so that it can detect the fact of rotation and the direction of rotation, and it applies a signal indicative of that condition by line 72 to the counter 40.

If, instead, the rotatable element 56 were to rotate in a clockwise direction, corresponding to reversal of the tape direction, then first sensor 64, and then both sensors, and finally, only sensor 66 would send signals to the direction logic unit 38. The logic unit, using electronic gates, is capable of interpreting those signals to means that a rotation has been in the clockwise direction. Unit 38 supplies a signal indicative of that situation to the counter 40 by line 72.

Counter 40 counts pulses that are furnished to it from the tachometer. It increases the count for one direction of rotation and decreases the count when the direction of rotation is reversed. The number of counts has a fixed relation to the number of rotations of the rotatable member 56.

The entry device 30 of FIG. 5 is a keyboard in this example, but it can be any one of the peripheral devices that are used to apply input data in the form of pulses of voltage levels into a counter. In this example, signals from the entry device are furnished by a line 74 to the data storage unit 44. Information stored in that unit has the same form as do the counts stored in counter 40. Its function is to store a count rather than to do counting.

The adder unit 42 serves to compare the count in the data storage unit 44 with the count stored in the counter 40. Its function is to determine what difference there is between those two counts and to furnish an output signal corresponding to the difference. The output signal is furnished to the control logic 46 by line 76. The difference information includes information which indicates whether the count in counter 40 is greater or less than the count that is stored in the data storage unit 44.

The control logic unit 46 responds to input signals to furnish signals to the tape transport drive unit 34. It was explained previously that that tape transport drive unit is a standard one capable of driving the tape forwardly at high speed or forwardly at the speed at which the tape is to be read. It can stop the tape and it can reverse the direction of tape drive. It responds to electrical signals applied to an input terminal block. The control logic unit 46 generates control signals depending upon the inputs that it receives from the adder on line 76 and from the position signal sensor on line 78. If the signal on line 76 indicates that the count in the data storage unit exceeds the count in counter 40, then the control logic will generate and deliver to the transport drive a signal which causes the drive to transport the tape rapidly in the forward direction. Conversely, if the signal from the adder 42 indicates that counter 40 has the greater count, then the control logic unit 46 will furnish a signal to the transport drive causing it to rewind. If the count at the data storage unit is equal to the count at counter 40, so that the difference is zero, then the adder 42 will furnish a signal by line 76 to the control logic unit which, in this embodiment, causes the tape transport drive unit to transport the tape in the forward direction at the "read" speed. The control logic unit also furnishes a signal to the transport drive which energizes the read head.

The transport drive furnishes a video signal by line 80 to the monitor 82 which includes the screen 18 of FIG. 1. In the preferred form of the invention, audio signals are impressed upon the tape at a reference position corresponding to reference count which, in the apparatus shown, is 100, but which could be any other count. When the tape transport is moving in the reverse direction, the heads are energized. They are sensitive to that audible signal, and when the portion of the tape on which that signal is impressed passes the head, signal is applied by line 84 to the position signal sensor 48. That sensor provides a signal by line 78 to the control logic which results in stopping the tape. The position signal sensor also furnishes a signal by line 86 to the reset unit 50 which applies a reset signal to the data storage unit 44 and to the counter 40 returning them both back to initial count. Other audio signals at the end of the tape, or elsewhere, can be used to initiate other control actions.

This embodiment also includes a provision in the entry device keyboard 30 for sending a signal by line 88 to the reset unit to reset the counter so that resetting can be accomplished manually.

The system of FIG. 5 has the advantage that it can, and in this embodiment does, employ standard electronic circuitry in its several block units. That circuitry can be packaged in relatively small size and housed within the add-on cabinet 32 of FIG. 2. It can be interconnected electrically and conveniently with the transport drive unit 34. That simplification is made possible by the tachometer arrangement which requires no physical connection between the system and the tape transport mechanism. It is necessary to attach the mirror to a rotating element of the mechanism, but that is accomplished so easily that it does not really constitute a modification of the transport unit.

With respect to the tachometer and that mirror, a number of modifications are possible within the scope of the invention. For example, instead of having a short segment of mirror, the arrangement could be reversed so that all but one segment of the periphery of the rotating element is mirrored.

Although I have shown and described certain specific embodiments of my invention, I am fully aware that many modifications thereof are possible. My invention, therefore, is not to be restricted except insofar as is necessitated by the prior art.

I claim:

1. In a control system for a tape reader having a reading hed and having a transporting mechanism which provides transport of a tape in the forward and reverse directions and further includes a rotatable member of the kind that rotates in a forward motion when the tape is transported forwardly past said head and that rotates in the reverse direction when the tape is transported in the reverse said direction past said head and that does not rotate when the tape is not being transported past said head, the improvement which comprises:
    means responsive to rotation of said rotatable member in both directions for developing an algebraic count indicative of the resultant number of times that said rotatable member has revolved in one direction;
    means for comparing a reference count with said algebraic count and for providing a difference signal which indicates whether the counts are equal, whether the algebraic count is greater than the reference count, and whether the algebraic count is less than the reference count; and
    means responsive to said difference signal for causing said transporting mechanism to transport said tape until said difference signal indicates that said counts are equal.

2. The invention defined in claim 1 which further comprises:
    reference means for developing a reference count; and
    means sensitive to output signals of a given character from said head for causing said reference count means to develop a given reference count.

3. The invention defined in claim 2 in which said means sensitive to output signals of a given character from said head further comprises means for causing said transport mechanism to drive said rotatable member until the algebraic count equals said given reference count.

4. The invention defined in claim 2 in which said means sensitive to output signals of a given character from said head further comprises means for causing the algebraic count to correspond to said given reference count.

5. The invention defined in claim 1 in which said means responsive to said rotation of said rotational member for developing an algebraic count comprises a mirror carried by said rotatable member;
    a source of light directed towards said rotatable mirror; and
    a light sensor positioned to receive light from said source by reflection from said mirror when the mirror occupies a position within a given range of angular positions as an incident of rotation of said rotatable member.

6. The invention defined in claim 5 in which said means responsive to rotation of said rotatable member for developing an albegraic count further comprises a second means sensitive to light from said source after reflection from said mirror and positioned to receive reflected light when said mirror occupies a different range of angular positions as an incident to rotation of said rotatable member;
    said means responsive to rotation of said rotatable member for developing an algebraic count being effective to increase the count when reflected light is received first by said first light means for receiving reflected light and they by said second means for receiving reflected light;
    said means responsive to rotation of said rotatable member for developing an algebraic count being effective to decrease the count when reflected light is received first by said second means for receiving reflected light and thereafter by said first means for receiving said reflected light.

7. In a tape transport system which provides transport of a tape in the forward and reverse directions and further includes a member that rotates in one direction as the tape is advanced and which rotates in an opposite direction when the tape is reversed and which does not rotate when the tape is not being transported, the improvement which comprises:
    a mirror carried by said rotating member;
    light means for directing a beam of light upon said rotating member such that it impinges upon and is reflected by said mirror when the mirror moves through a given segment of rotation;
    first light sensing means positioned to receive light from said light means after reflection from said mirror when said mirror moves through one portion of said segment of rotation to provide a signal responsive to illumination; and
    a second light sensing means positioned to receive light from said light means after reflection from said mirror, when said mirror moves through a portion of said segment different from said one portion to provide a signal responsive to illumination; and
    direction logic means responsive to said signals from said first and second light sensing means for distinguishing whether the tape is being transported in the forward or the reverse direction.

8. The invention defined in claim 7 in which said first and second light sensing means comprise first and second light sensitive cells that provide an electrical signal responsive to being illuminated, said first and second cells being disposed on opposite sides of said light means;

said mirror extending over a sufficiently long distance such that light is reflected first to one cell and then to both cells and finally to said second cell during the course of rotation of said rotatable member whereby a signal is furnished by both cells simultaneously for one period and by one or the other of said cells prior to that period and by the other of said cells following said period whereby to provide a signal to said direction logic means to distinguish whether the tape is being transported in the forward or the reverse direction.

* * * * *